Jan. 13, 1953  D. N. EVANS  2,625,362
VALVE
Filed Sept. 20, 1948
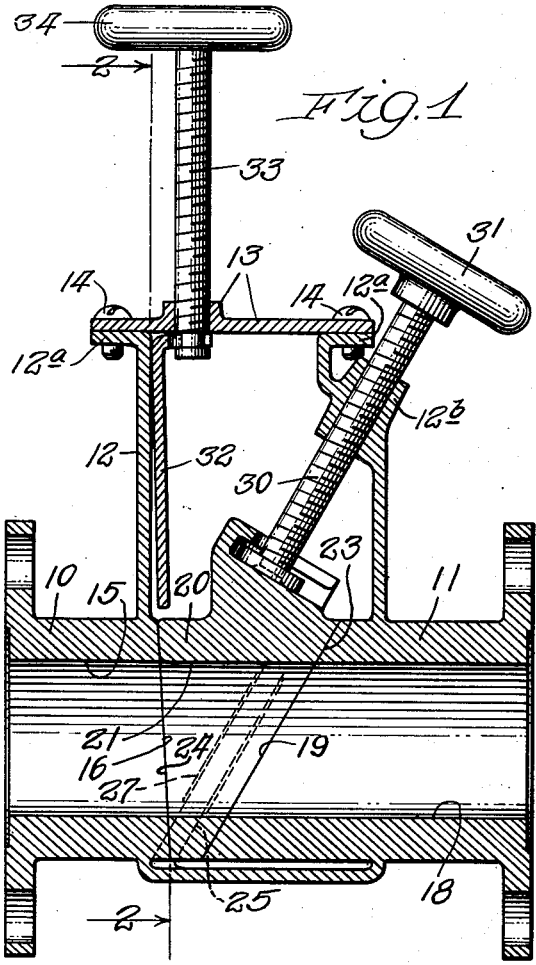
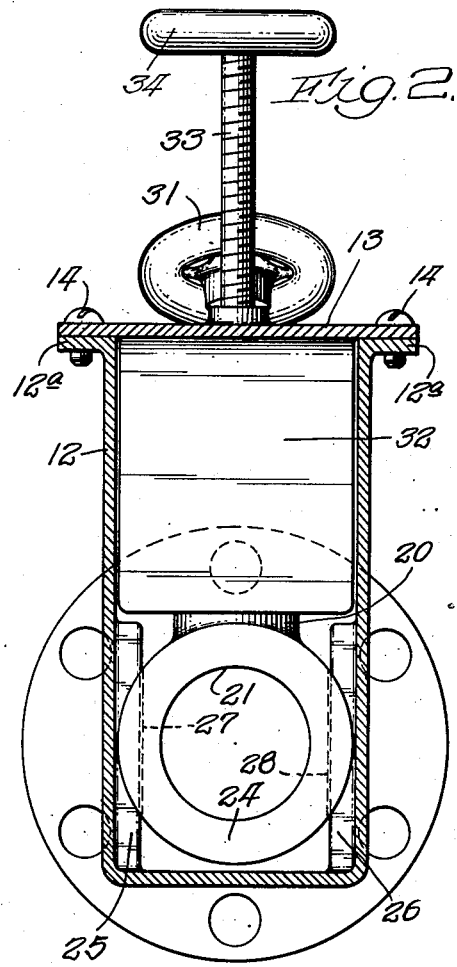
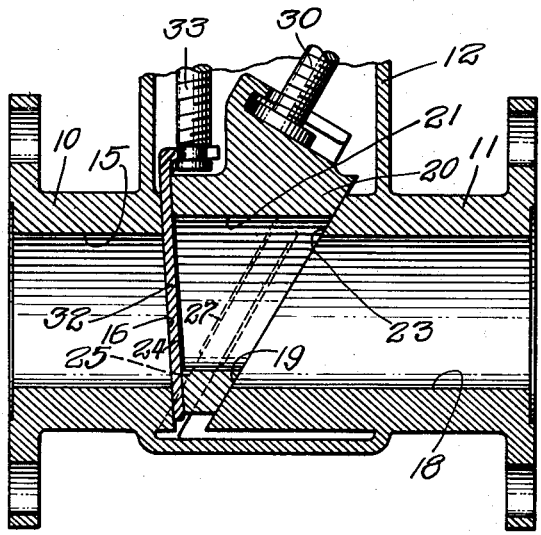
Inventor:
Douglas N. Evans,
By Stratton, Schroeder,
Merriam & Vifgren, Attys.

Patented Jan. 13, 1953

2,625,362

UNITED STATES PATENT OFFICE 2,625,362

VALVE

Douglas N. Evans, Gary, Ind., assignor to Inland Steel Company, a corporation of Delaware Application September 20, 1948, Serial No. 50,018

9 Claims. (Cl. 251—58)

This invention relates to a valve, and more particularly to a valve providing a clean seat portion and having a continuous, nonleakable, unbroken channel in which no seats, guides or other obstructions are in the channel to retard the flow of fluid therethrough.

Valves which are commonly used in fluid systems, particularly in gas systems, have had disadvantages in that it has heretofore been impossible to devise a valve having a clean seat in which the channel through the valve was continuous and unbroken and contained no seats, guides or other obstructions to impede the flow of liquid, and at the same time was nonleakable. The present invention provides an improved valve which overcomes these disadvantages.

The invention will be described as related to the embodiment set out in the accompanying drawings in which:

Fig. 1 is a longitudinal vertical cross section through a valve constructed in accordance with the invention with the valve in open position;

Fig. 2 is a transverse cross section taken along the line 2—2 of Fig. 1; and

Fig. 3 is a fragmentary section similar to Fig. 1 but with the valve closed.

Referring now to the drawings, the valve comprises a housing having an inlet portion 10, an outlet portion 11 and a bonnet 12 with a removable cover 13. As illustrated, opposite walls of the bonnet are flanged at 12a and the removable cover 13 is secured thereto by means of bolts 14.

The inlet portion 10 has a passageway 15 therethrough and said portion terminates in a first seat 16 in said housing within the bonnet, this seat being disposed substantially transversely of the passageway 15. The outlet portion 11 has a passageway 18 therethrough and terminates in a second seat 19 in said housing within the bonnet, the second seat being spaced from and generally facing the first seat and inclined with respect thereto, the angle of inclination between the seats preferably being of the order of 35 degrees. A wedge-shaped member 20 is provided to cooperate with the seats 16 and 19. The wedge member has a passageway 21 therethrough, the passageways 15, 18 and 21 being of circular cross section and all being of the same diameter. The wedge member has generally oppositely disposed faces 23 and 24 inclined at the same angle as the spaced seats 16 and 19, these faces being adapted to engage the seats as shown in Fig. 1 to align the passageways 15, 18 and 21 and form a continuous, nonleakable, unbroken channel of uniform diameter through the housing when the valve is open, this channel resembling the inside of a pipe and having no guides, seats or other obstructions to retard the flow of fluid therethrough, while the engagement of the faces of the wedge member with the respective seats provides a non-leakable arrangement.

A pair of guides 25 and 26 extend at an angle to the passageways parallel to the seat 19, these guides engaging channels 27 and 28 in the wedge member so that said wedge member is reciprocably movable parallel to the second seat.

A threaded stem 30 having an operating handle 31 is threadable on the bonnet and extends therethrough, this stem being rotatably secured to the wedge member and extending parallel to the seat 19 through a cooperating threaded portion 12b in a wall of the bonnet.

A valve plate or gate 32 of larger face area than the cross sectional area of the passageways 15, 18 or 21 is carried adjacent the first seat 16 within the bonnet 12, and a threaded stem 33 having an operating handle 34 extends parallel to the plane of the seat 16 and extends through the removable cover 13, being mounted in a cooperating threaded portion 13a of the cover. The stem is rotatably mounted on the plate 32.

In the operation of the valve, in order to open the valve the gate 32 is retracted into the bonnet to the position of Fig. 1 by means of the stem 33 and the wedge 20 is moved down by means of the stem 30 so that the faces of the wedge engage the respective seats 16 and 19 as shown in Fig. 1. This arrangement provides a clean seat valve in which there is an unimpeded, nonleakable channel of uniform diameter between the inlet and the outlet. In this position of the parts the cover 13 may be removed and the plate 32 may be taken out of the bonnet and access may be had to the wedge. If it is desired to close the valve the stem 30 is backed off, this operation moving the wedge member 20 along the guides 25 and 26 parallel to the seat 19 to a position spaced from the seat 16. With the parts in this position the stem 33 may be turned to move the gate into the space between the wedge member and the seat 16. By turning the stem 30 to clamp the gate 32 between the wedge 20 and the seat 16 the channel through the valve is blocked off and the valve is closed as shown in Fig. 3. Since the flow of fluid is from left to right as the parts appear in Fig. 3, when the gate is down in closed position no fluid can enter the bonnet.

The foregoing detailed description has been given for clearness of understanding only and no unnecessary limitations should be understood therefrom.

I Claim:

1. A valve of the character described, comprising: a housing having inlet and outlet portions, said inlet portion having a passageway therethrough and terminating in a first seat, and said outlet portion having a passageway therethrough and terminating in a second seat generally facing said first seat and being inclined with respect thereto; a wedge member having a passageway therethrough, said wedge member having generally oppositely disposed faces forming it into a figure congruent with the opening between said seats, and which in one position engage said seats to align said passageways all of which are the same cross-sectional size and shape and form a continuous unbroken channel through said housing; means for moving said wedge member to a position spaced from one of said seats; a gate in said housing; and means for moving said gate into the space between said wedge member and seat, said gate blocking said channel and closing said valve when clamped in said space by said wedge member.

2. A valve of the character described, comprising: a housing having inlet and outlet portions, said inlet portion having a passageway therethrough and terminating in a first seat disposed substantially transversely of said passageway, and said outlet portion having a passageway therethrough and terminating in a second seat generally facing said first seat and being inclined with respect thereto; a wedge member having a passageway therethrough, said wedge member having generally oppositely disposed faces forming it into a figure congruent with the opening between said seats and adapted to engage said seats to align said passageways all of which are the same cross-sectional size and shape and form a continuous unbroken channel through said housing; means for moving said wedge member parallel to said second seat to a position spaced from said first seat; a gate in said housing; and means for moving said gate into the space between said wedge member and said first seat, said gate blocking said channel and closing said valve when clamped in said space by said wedge member.

3. A valve of the character described, comprising: a housing having inlet and outlet portions and a bonnet with a removable portion, said inlet portion having a passageway therethrough and terminating in a first seat disposed substantially transversely of said passageway, and said outlet portion having a passageway therethrough and terminating in a second seat spaced from and generally facing said first seat and being inclined with respect thereto; a wedge member having a passageway therethrough, said wedge member having generally oppositely disposed faces inclined with respect to each other forming it into a figure congruent with the opening between said seats and which engage said seats to align said passageways all of which are the same cross-sectional size and shape and form a continuous unbroken channel through said housing; means for moving said wedge member to a position spaced from said first seat; a gate adjacent said first seat within said bonnet; and means for moving said gate in a straight line into the space between said wedge member and said first seat, said gate blocking said channel and closing said valve when clamped in said space by said wedge member.

4. Apparatus of the character claimed in claim 3, wherein the means for moving said wedge member and gate comprise stems threadable on said bonnet and extending therethrough, the movement of the respective wedge and gate members being in a straight line along a projection of the axis of the respective stems.

5. A valve of the character described, comprising: a housing having inlet and outlet portions and a bonnet with a removable cover, said inlet portion having a passageway therethrough and terminating in a first seat in said bonnet disposed substantially transversely of said passageway, and said outlet portion having a passageway therethrough and terminating in a second seat in said bonnet, said second seat being spaced from and generally facing said first seat and being inclined with respect thereto; a reciprocably movable wedge member having a passageway therethrough, said wedge member having generally oppositely disposed faces forming it into a figure congruent with the opening between said seats and adapted to engage said seats to align said passageways all of which are the same cross-sectional size and shape and form a continuous non-leakable, unbroken channel through said housing; guide means for said wedge, said guide means extending parallel to said second seat; a stem threadable on said bonnet and extending therethrough for moving said wedge member along said guide means parallel to said second seat to a position spaced from said first seat; a gate adjacent said first seat within said bonnet said gate being removable with said cover when the valve is open; and a stem threadable on said cover and extending therethrough for moving said gate into the space between said wedge member and said first seat, said gate blocking said channel and closing said valve, when clamped in said space by said wedge.

6. A valve of the character described, comprising: a housing having inlet and outlet portions and a bonnet with a removable cover, said inlet portion having a passageway therethrough and terminating in a first seat in said bonnet disposed substantially transversely of said passageway, and said outlet portion having a passageway therethrough and terminating in a second seat in said bonnet, said second seat being spaced from and generally facing said first seat and being inclined at an angle of the order of 35 degrees thereto; a reciprocably movable wedge member having a passageway therethrough, said wedge member having generally oppositely disposed faces forming it into a figure congruent with the opening between said seats and adapted to engage said seats to align said passageways all of which are the same cross-sectional size and shape and form a continuous, unbroken channel through said housing, said passageways all being of circular cross section and of the same diameter; guide means for said wedge, said guide means extending parallel to said second seat; a stem threadable on said bonnet and extending therethrough for moving said wedge member along said guide means parallel to said second seat to a position spaced from said first seat; a gate adjacent said first seat within said bonnet said gate being removable with said cover when the valve is open; and a stem threadable on said cover and extending therethrough for moving said gate into the space between said wedge member and said first seat, said gate blocking said channel and closing said valve when clamped in said space by said wedge.

7. Apparatus of the character claimed in claim 6, wherein the stem for moving the wedge extends parallel to said second seat and the stem for moving the gate extends parallel to said first seat.

8. In a gate valve, a valve housing having a channel passing directly therethrough, said channel having a wedge-shaped opening substantially transverse of the channel providing a pair of valve seats inclined to one another, a housing enclosing the opening, a wedge-shaped member congruent with said opening and having a channel sized opening therethrough, said member being movable into the opening into direct engagement with both of said seats to form a continuous, unbroken passage, and said member being movable out of the opening, and a gate movable into and out of the opening on one side of the wedge when the wedge is out of engagement with at least one of said seats, whereby the channel may be closed to the flow of fluid.

9. In a gate valve, a valve housing having a channel of circular cross section and uniform diameter passing directly therethrough, said channel having a wedge-shaped opening substantially transverse of the channel providing a pair of valve seats inclined to one another, a housing enclosing the opening, a wedge-shaped member congruent with said opening and having a channel sized opening therethrough; means for moving said member in a direction parallel to the plane of one of said seats into the opening into direct engagement with both of said seats to form a continuous, unbroken passage and out of the opening, a gate and means for moving said gate in a direction parallel to the plane of the other of said seats into and out of the opening on one side of the wedge, whereby the channel may be closed to the flow of fluid by clamping said gate in said opening between said seat and wedge member.

DOUGLAS N. EVANS.

REFERENCES CITED

The following references are of record in the file of this patent:

UNITED STATES PATENTS

| Number | Name | Date |
|---|---|---|
| 1,442,204 | Wilson | Jan. 16, 1923 |
| 1,609,894 | Trent | Dec. 7, 1926 |
| 1,813,418 | O'Leary | July 7, 1931 |
| 2,031,151 | Eulberg | Feb. 18, 1936 |
| 2,231,614 | Burke | Feb. 11, 1941 |

FOREIGN PATENTS

| Number | Country | Date |
|---|---|---|
| 148,036 | Austria | of 1936 |
| 610,964 | Germany | of 1935 |